Dec. 1, 1970     MICHIO SUDO     3,543,334

APPARATUS FOR MANUFACTURING THERMOPLASTIC FILMS

Filed April 29, 1968     3 Sheets-Sheet 1

INVENTOR.
Michio Sudo
BY Michael S. Stroker
Attorney

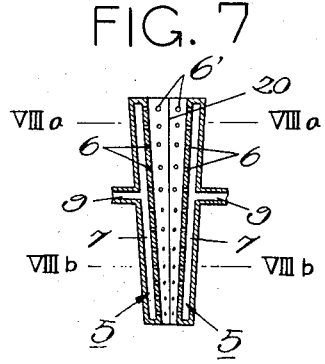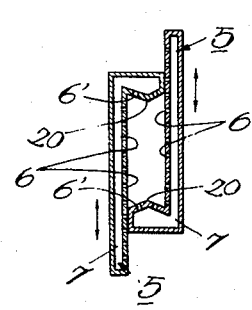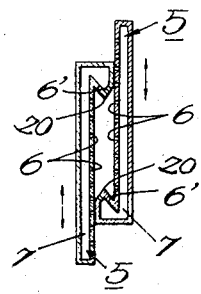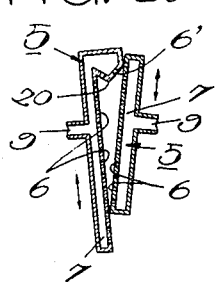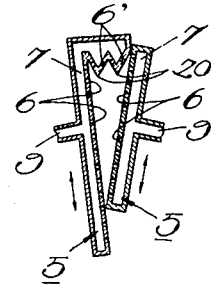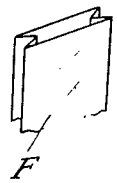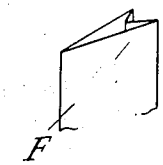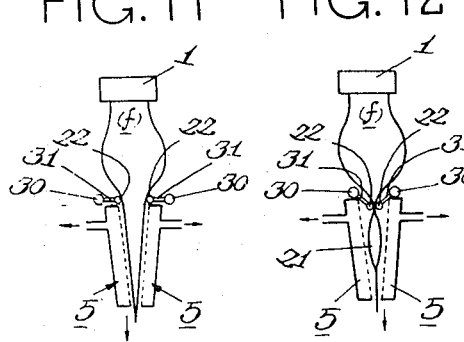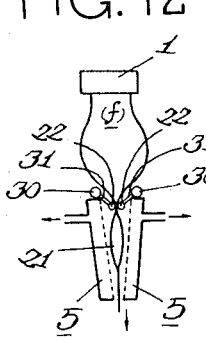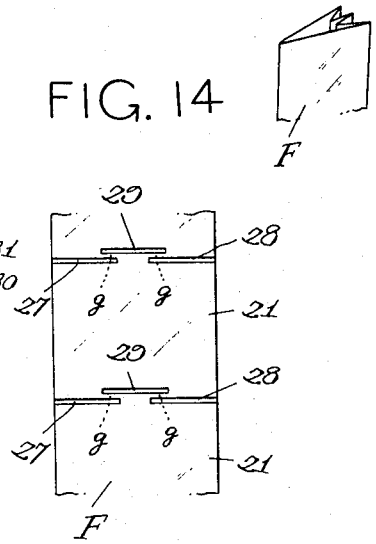

United States Patent Office 3,543,334
Patented Dec. 1, 1970

3,543,334
APPARATUS FOR MANUFACTURING
THERMOPLASTIC FILMS
Michio Sudo, Tokyo, Japan, assignor to Mitsubishi Yuka
Kabushiki Kaisha, Tokyo, Japan
Filed Apr. 29, 1968, Ser. No. 724,795
Claims priority, application Japan, May 9, 1967,
42/28,883
Int. Cl. B29d 23/04
U.S. Cl. 18—14                                    9 Claims

ABSTRACT OF THE DISCLOSURE

Cooling arrangement for cylindrical film extruded on an extruder die. This cooling arrangement comprises a tank for cooling liquid with two perforated screening boxes arranged therein on opposite sides of the extruded cylindrical film. Means are provided for circulating the cooling liquid through the aforesaid screening boxes.

---

Figure 1:
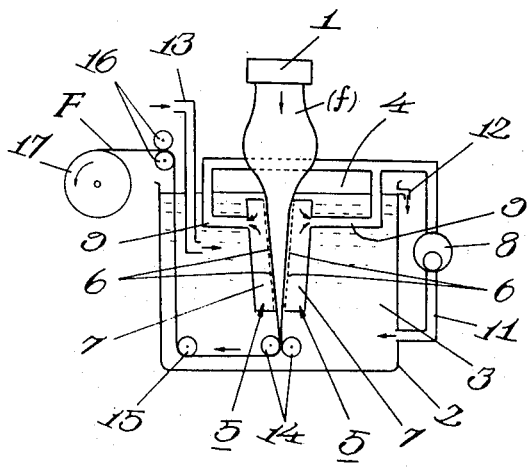

The present invention relates to apparatus for the manufacturing of thermoplastic synthetic resin films.

To have cylindrical films of thermoplastic resin in general there are known methods largely classified into two kinds, namely the air cooling method and the liquid cooling method, but in the former, as it is necessary to have a quite long distance and time in order to have the cylindrical film in fused resin condition protruded from a protruder completely and solidified by blowing air thereout, it can not avoid the largeness of the equipment itself, and also as the fused resin is cooled gradually, the product has a defect that the resin is crystallized and its transparency gets poor and naturally the quality thereof can not be elevated.

On the other hand, the cooling method of the latter removes the defect in the air cooling method and the crystallization of the resin is prevented by its quick cooling effect of a cooling liquid and the quality of the product can be elevated, but an efficient manufacturing method and its equipment based on a compact and simple device have not yet been disclosed.

That is, among the liquid cooling method presently and broadly known such a method, in which after having air blown along the outer periphery of cylindrical film, on the outer side or the inner side of said film being provided with a water cooling jacket, having the surface of the film being contacted with said side wall, whereby cooling is expected in keeping the cylindrical shape of the film, or a method in which having air blown into the cylindrical film protruded downwardly and vertically from an annular shaped die and having the size of the cylinder kept in a desired dimension, cooling water kept falling along the outer periphery of the cylindrical film in continuation, whereby the film is cooled and solidified at its cylindrical form is mainly employed, but in either case it is necessary to replace the water cooling jacket or the water cooling ring with the one conforming with the diameter of the film at each time when the diameter of the film changes, the handling of the film and others become very complicated, and in addition, since the protruded cylindrical film has to be conducted to the cooling part in keeping a proper distance, the largeness of the equipment can not still be avoided. Also, it is noted recently, however, in referential literatures that air being blown into the inside of the cylindrical film protruded from an annular die and expanded it to a desired size, and conducted into water and immediately cooled and solidified therein, and then the film being flattened by means of a guide plate in the water, and the cylindrical film is thereby manufactured in continuation by means of a drawing roll in the same water, but the cylindrical form of the film, not being able to maintain its cylindrical form due to the pressure of water, deforms and generates shrinkages, and in addition, as the inner walls of the cylindrical film being closely contacted mutually, whereby since various troubles are encountered, it is described as that such troubles are to be prevented by having water put into the inside of the cylindrical film, but as the moisture in the inside water of the cylindrical film can not completely be removed, the moisture still remains on the inside of the film, and when packing bodies are made of such a film, the contents of the packages will surely be badly affected, and therefore such a manufacturing method of the cylindrical film is not still in the stage of practice.

The present invention is to propose the manufacturing equipment for thermoplastic synthetic resin film of a liquid cooling system by a cooling liquid based on certain specific equipment and method which are entirely different from the manufacturing method and its equipment of cylindrical films that have many defects as described above.

That is, according to the present invention, the fused resin $f$ being protruded in continuation downwardly from the annular or elliptical die of a protruder and air being blown into the inside of the cylindrical film protruded in fused state at the same time, being expanded to a required size, and then conducted into a cooling liquid tank, whereby being cooled and solidified, and the outer surface of the film being sucked and protected along a mold, the inside of which is always kept in a negative pressure, provided inside the tank in order to prevent the variation of shape and the generation of shrinkages that may be produced by the water pressure, the bag-shaped film of any desired form is manufactured by one operation, without either generating any shrinkages on the film surface or the close contact of the inside surfaces within the film, by the selection of the mold of various shapes, and by the proper selection of the mold the cylindrical film of any preferred shape such as a pillow type, both side corrugation types or one side corrugation type can be manufactured, and furthermore at the same time sealing per bag being made possible in the course of the continued molding of the cylindrical film, whereby the present invention specifically relates to the manufacturing method of thermoplastic synthetic resin and its equipment suitable for various objects and various uses.

In consideration of said objects and other objects that will be described hereinbelow, an embodiment according to the present invention will be described in detail in the following with reference to the accompanying drawings.

Figure 2:
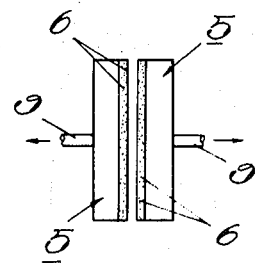
Figure 3:
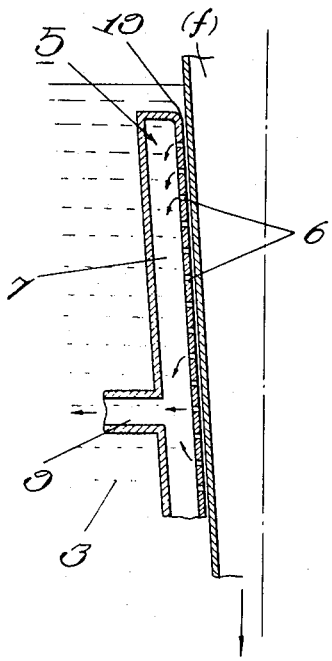
Figure 4:
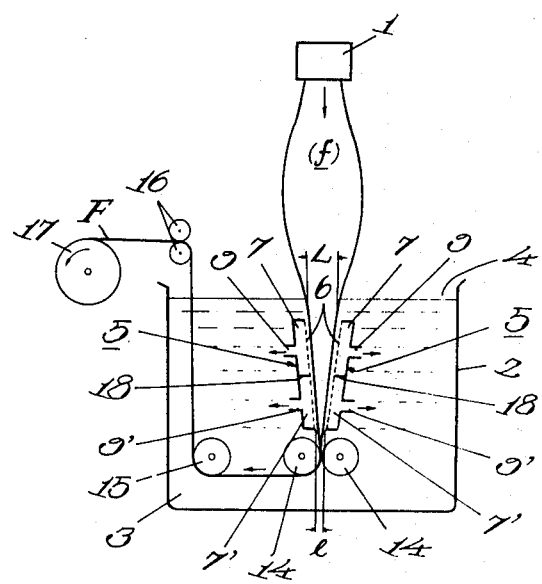
Figure 5A:
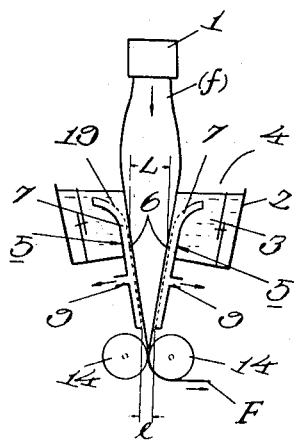
Figure 5C:
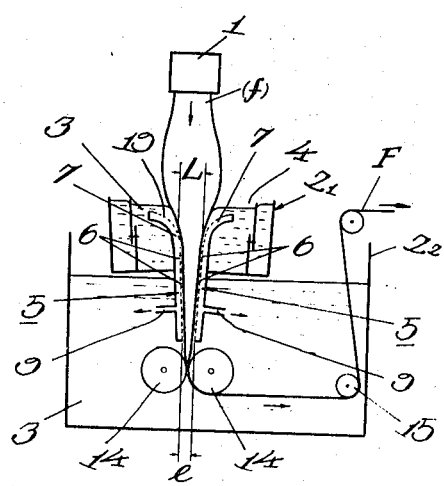
Figure 5B:
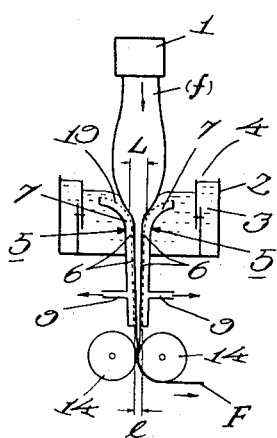

In the accompanying drawings:

FIG. 1 is a side view of an embodiment according to the present invention showing the manufacturing method and the basic principle of its equipment;

FIG. 2 the plan view showing the structure of the important portions thereof;

FIG. 3 an enlarged sectional view of the important portions showing the mutual relation between the fused synthetic resin film $f$ to be cooled and solidified and the liquid screening boxes within the cooling liquid tank, and shows the cooled and shaped state of the film $f$;

FIG. 4 another view seen from a side direction of another embodiment according to the present invention;

FIGS. 5a–5c still other views seen from a side direction of the other embodiments according to the present invention;

FIGS. 6a, 6b, 6c, and 6d, respectively, the front views of four examples of the screen, surfaces of the liquid screens boxes;

FIGS. 7–10c each shows the liquid screen boxes in the case of the screens imparting additional corrugating work to the cylindrical film, and also shows a corrugated film formed thereby, and FIG. 7 a sectional side view of screen plates for molding both side corrugated cylindrical film shown in a perspective view in FIG. 10a; FIGS. 8a and 8b, respectively, sectional views through the lines VIIIa—VIIIa and VIIIb—VIIIb of FIG. 7; FIGS. 9a and 9b cross-sectional end views, respectively, of the liquid screen boxes for molding the one side corrugated cylindrical films shown in perspective views in FIGS. 10b and 10c and FIGS. 11–14 show one state, respectively, in the practice of the present invention so made as to enable to manufacture bag-shaped portions with predetermined spacings in continuation in imparting sealing work intermittently in the course of molding the cylindrical film $f$, and FIGS. 11 and 12 show, respectively, the course seen from a side direction of the sealing work, FIG. 13 the front view of bars for sealing, and FIG. 14 the front view of a portion thereof.

Next, each structure of the equipment according to the present invention as illustrated in the drawings will be described with reference to each designation thereof.

Numeral 1 indicates an annular or elliptical die provided on the front end of the protruding mold of thermoplastic synthetic resin and it works to extrude thermoplastic synthetic resin like polyethylene or polypropylene as cylindrical film $f$ in a thermally fused state. Numeral 2 indicates a cooling liquid tank filled with a cooling liquid 3 and has its opening 4 facing below said die 1. Numerals 5, 5 indicate a pair of liquid screening boxes mutually opposed below the liquid surface of said cooling liquid 3, being positioned directly below said die 1, are arrangedly provided with desired spacings, cooling liquid screening portions 6, 6 being formed, respectively, on the opposed surface sides of said screening boxes 5, 5, are enabled to suck the cooling liquid 3. Numerals 7, 7 indicate the cooling liquid chambers of the screening boxes 5, 5, and suction tubes 9, 9 are projectedly formed on the surface other than the cooling liquid suction portions 6, 6.

Now, several embodiments according to the present invention will be described in the following under the structure described above.

Thermoplastic synthetic resin being first protruded through the die 1 of the protruder, whereby the cylindrical film $f$ being formed, air being blown into the inside thereof and thereby the film being expanded to a desired size, is conducted into the cooling liquid tank immediately of the cooling liquid 3, water or table-salt water for instance. Here, the cylindrical film $f$ is immediately cooled and solidified.

Figure 6A:
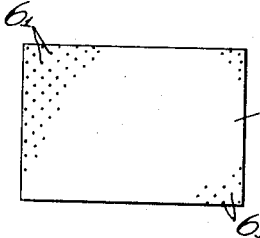
Figure 6B:
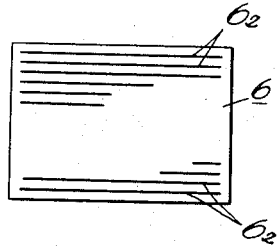
Figure 6C:
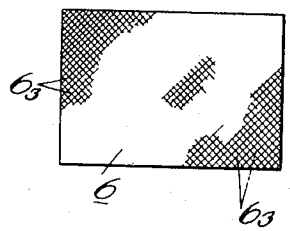
Figure 6D:
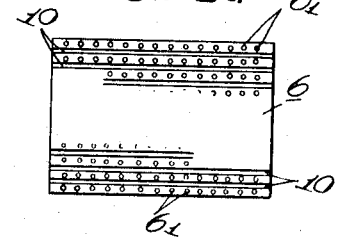

Within the tank 2 a pair of thin box type screen boxes 5, 5 made airtight, being arranged mutually opposed substantially vertically with a certain gap, on the opposed surfaces thereof perforations $6_1$, slits $6_2$ or small mesh screen nets $6_3$ are provided as shown in FIG. 6a–FIG. 6d, and furthermore numerous parallel recessed grooves 10 as shown in FIG. 6d being provided, whereby the flow-in of the cooling liquid is expedited, and thereby the cooling liquid screens portions 6, 6 being formed, and whereby to the work of the cylindrical film 5 passing through the gap between a pair of the screening boxes 5, 5 is more effective.

As shown in FIG. 1, with the suction tubes 9, 9 of a pair of the sucking screen boxes 5, 5 a suction pump motor 8 and others being connected, the cooling liquid 3 being sucked under a desired pressure, and by the other connection tube 11 connected with the suction pump motor 8 the cooling liquid 3 is discharged and cycled directly or through a heat dissipation mechanism (not shown) to the bottom portion of the liquid tank 2.

In addition, the upper surface of said pair of the screen boxes 5, 5 being made so as to be positioned either conform with each other substantially or submerged slightly below by a degree of 0–30 mm. under the liquid surface, and further in order to keep the cooling liquid surface constant always an overflow opening 12 being provided on the side wall of the tank 2, and furthermore in order to keep the temperature on the upper portion of the tank 2 within a predetermined range so as the cooling temperature to be 20–25° C., a supplementing tube 13 is conducted into the inside of the cooling tank 3 from the outside of the tank 2, whereby it is so made as the temperature of the cooling liquid 3 is regulated as required.

Consequently, the cylindrical film $f$ protruded from the die of the protruder is flattened in the course of travellingly advance along the pair of the liquid screening boxes 5, 5, but through the structure of the perforations $6_1$, the slit holes $6_2$ or the net screen $6_3$ provided on the cooling liquid screening portions 6, 6 of the screening boxes 5, 5, the cylindrical film $f$ is passed through the cooling liquid 3, in other words by the negative pressure obtained at the cooling liquid sucking portions 6, 6 the cylindrical film $f$ being sucked, in the gap between the film $f$ and the cooling liquid screening portions 6, 6 of the screening boxes 5, 5 the cooling liquid 3 being flown towards each of the perforations 6, 6 slit holes $6_2$ or the net screen $6_3$ from the tank 3 continuously, a fresh cooling liquid 3 quickly cooling the outer surface of the film $f$ in continuation, whereby, at the same time, excellent transparent film $f$ being obtained, and said flowing-in cooling liquid 3 serves like a lubrication oil, as shown in FIG. 3, and therefore even if the film $f$ travels in contact with the cooling liquid screening portions 6, 6 of the screening boxes 5, 5, there is no fear of damaging the surface of the film $f$, and also there will be no variation in shape on the cylindrical film $f$ by receiving the variation of the liquid pressure generated in company with the change in depth of the liquid, and furthermore no generation of shrinkages takes place on the outer surface of the formed film $f$.

The cylindrical film $f$ thus cooled, solidified and passed through a pair of reeling rolls 14, 14 provided below a pair of the screening boxes 5, 5 is drawn out to a reeling roll 17 through rolls 16, 16 for removing the cooling liquid, which are provided on the outside of the tank 2.

The present embodiment is a general one for the manufacturing method and its manufacturing equipment for so-called pillow type synthetic resin film $f$, and in the following the individual structure for each of other types of the film will be described in detail with reference to their accompanying drawings.

First, in a pair of screening boxes 5, 5, as shown in each of the drawings, the distance between the mutually opposed cooling liquid screening portions 6 and 6 is differentiated in the upper spacing L and the lower spacing $l$, and generally it is preferable to be $L>l$. It has been ascertained that L is 5–50 mm. and $l$ 5–15 mm. is desirable through experiments, but if the upper spacing L is specially larger, the amount of sucked water of the screening boxes 5, 5 has to be made larger and the flowing speed of the cooling water naturally getting larger, and vibrations are generated in the cylindrical film $f$ contacting therewith and bad effect is brought to the formed film produced thereby, and also it has been made clear that the spacing L gets narrow, the reeling operation of the cylindrical film $f$ becomes difficult.

As described above, the spacing between the upper and lower portions L, $l$ is $L>l$ in general, but both the screening boxes 5, 5 may be arranged as $L=l$ or $L<l$ by the kind of synthetic resin, the thickness of film or the speed of molding.

Also, said screening boxes 5, 5, as shown in FIG. 4, being partitioned by separators 18, 18 at the center thereof, whereby cooling liquid sucking chambers 7, 7' and 7, 7' being formed in the upper and lower thereof each independent of the water and thereby different liquid pressures based on the depth of the cooling liquid 3 being imparted to the upper and lower portions thereof, sucking force working on the upper and lower sucking chambers 7, 7' and 7, 7' being differentiated by sucking tubes 9, 9' and 9, 9' communicated with said chambers 7, 7' and 7, 7', in other words since the liquid pressure in the upper liquid sucking chambers 7, 7 is smaller than that of the lower cooling liquid sucking chambers 7', 7', although its small sucking force suffices, but as the liquid pressure works greater in the lower cooling liquid sucking chambers 7, 7' in comparison with those of the upper sucking chambers 7, 7, by having its sucking force made greater, whereby the fear of rupture and deformation of the cylindrical film $f$ especially in its lower portion is prevented, and according to necessity, the partition plates 18, 18 are provided in steps in a plurality whereby multistep cooling liquid sucking chambers are constructed in the screening boxes 5, 5 and the elevation of formation effect by having the variation in liquid pressure distributed basing on the depth of the molds.

Also, there are some cases wherein an arced portion 19 is provided according to necessity on the mutually opposed upper portions of a pair of the screening boxes 5, 5. Said arced portion 19 is sometimes formed partially on the structure of the screening boxes 5, 5 as described before, and in some other cases as shown in FIGS. 5a–5c the upper portions mutually opposed of said screening boxes 5, 5 are bent in an arced form contactedly locally. In any case it is preferable that the radius of the arc of the arced portion 19 is in the range of 2–50 mm. By being constructed thus it can be expected that the fluidity of the cooling liquid 3 from the upper end will be good, and at the same time the conduity of the expanded cylindrical film $f$ can be maintained good, but such a structure is determined by the quality of synthetic resin, the thickness of film, and the like.

Furthermore, it is desirable that the pair of the screening boxes 5, 5, as described before, are in the same level with the liquid surface of the cooling liquid or the upper ends thereof are positioned submerged in the depth of about 30 mm. from the cooling liquid surface, especially since the film is cooled and solidified by the cooling liquid, if the screening boxes 5, 5 are submerged deeper than necessary, there is fear that the object thereof is deviated and it may be accompanied with the damage of rupture of the film and the like by the rise of the cooling liquid.

In addition also, it is desirable that in the cooling liquid screening portions 6, 6 of the mutually opposedly arranged screening boxes 5, 5, the surface thereof is made a material of heat resisting such as plastic like Teflon, bakelite, polypropylene or cloth. The perforations $6_1$, slit holes $6_2$, or the net screen of the cooling liquid screening portions 6, 6, the hole diameter or slit width in the lower portion being made larger in comparison with those of the upper portion or the number of the holes being made larger, whereby being able to prevent the liquid pressure and deformation based on the difference of the liquid and the screening holes $6_1$, $6_2$ are good to be below about 5 mm. in diameter, but if they are made smaller, the loss in pressure becomes greater, and they cause the blocking of the holes. On the other hand, if they are made too larger than necessary, the cylindrical film to be cooled is being sucked into by the holes more than necessary and there is fear that it is suckedly contacted with the screening portions and therefore, the size of the holes or slits has to be determined by the material of synthetic resin film, its thickness, and the amount to be protruded.

Next, the amount of the cooling liquid in the tank through the cooling liquid screening portions 6, 6 of the screening boxes 5, 5 in pair arranged mutually opposed is of course determined by the suction pump or the capacity of its motor 8, but the optimum condition thereof is such that the amount of the cooling liquid passes through between the passing cylindrical film $f$ and the cooling liquid screening portions 6, 6 at a proper strength and that the film is suckedly contacted with the cooling liquid screening portions 6, 6 at a proper and suitable strength, and when the sucking amount of the cooling liquid is too large, the outer surface of the film $f$ is closely contacted with the screening portions, the operation of the film is hampered, and the circulation of the cooling liquid becoming unsmooth, cooling effect corrugating short, elevation of the quality of the product is not only obtainable, also there is fear that the film is ruptured or deformed by the liquid pressure when the sucking amount of the cooling liquid is too small.

Anyhow, by having the reeling speed of the cylindrical film $f$ made 10 m./min.–400 m./min. and it has been ascertained that experiment have been obtained good results based on the aforesaid conditions.

Now, let us see the result the experiment result performed based on the equipment shown in FIG. 4.

(1) Formation conditions.

Protruder: Nozzle diameter 120 mm., length/dia.:25 (L/D)
Die: 250 mm. dia., spiral type
Screens 6, 6: Given with upper curve surface rectangular with lateral width, 600 mm., longitudinal width 300 mm. L: 10–15 mm., $l$:3–5 mm., 1.5 kw., cascade pump
Air gap: 350–400 mm.
Amount of protrusion: 200 kg./hr.

(2) Resin used:

High pressure polyethylene A—M.I. 0.5, S.G. 0.920
High pressure polyethylene B—M.I. 0.5, S.G. 0.927

(3) Results:

| Quality of film: | Present embodiment |
| --- | --- |
| Uneven thickness | Within ±15%. |
| Bending diameter | Below 2 mm. |
| Outer appearance | Good. |
| Curls | A little. |
| Transparency | Good. |
| Shock strength | Strong. |
| Heat seal ability | Good. |
| Shrinkage | None. |
| Formability: | |
| Formation stability | Good. |
| Cooling effect | Do. |
| Operability | Do. |
| (Formability range) thickness | 0.02–0.3 mm. |
| Bending diameter variation | Greatly characterized by that when blow ratio of 0.8–1.4 is obtainable without replacing the member. |

As will be seen from the above table, it is clear that the film is very excellent in outer appearance and at the same time that the film is very much excelled in formability.

Next, those embodiments shown in FIG. 5a or 5b are such that the cases wherein the constructures are given for preventing unqualified product based on the difference in the liquid pressure in the upper portion and the lower portion of a pair of the screen boxes 5, 5 and they are two examples in which the upper spacing L and the lower spacing $l$ are significantly different in both the screening boxes 5, 5 and in either case the liquid tank 2 is provided on only the upper portion of the screening boxes 5, 5 and the lower portion is taken out of the tank, and in consequence no great liquid pressure working on the lower portion is received, and though there is no fear of pressure rupture and deformation by the liquid pressure, and the formability of the cylindrical film is quite excelled, it has a defect that part of the flowing cooling liquid flows down out of the tank 2 with the film $f$ through between both the screening boxes 5, 5.

On the other hand, in the one shown in FIG. 5c the tank 2 of the cooling liquid being divided into the upper and lower portions, the upper portion of the screening boxes 5, 5 by the cooling liquid 3 of the upper tank $2_1$ and the lower portion can be cooled by the cooling liquid 3 of the lower tank $2_2$, and it is characterized by that there is no fear of the cooling liquid flowing down from the upper tank $2_1$ different from the former two.

Here, again the experiment results obtained based on the equipment of FIG. 5a, FIG. 5b, and FIG. 5c are shown in the following:

(1) Molding condition: Same as the condition described before, but L and $l$ in each case are different as shown in the lower column of the result.
(2) Resin used: Same as the resin described hereinbefore.

| Film quality | Present embodiment method | | |
|---|---|---|---|
| | Fig. 5a | Fig. 5b | Fig. 5c |
| Uneven thickness | Within±15 | Within±15 | Within±15. |
| Bending dia. variation | Below 2 mm | Below 2 mm | Below 2 mm. |
| Outer appearance | Water flow tracing | Good | Good. |
| Curling | A little | Small | Small. |
| Shrinkage | None | None | Easy to enter thin substance. |

| Formality | Fig. 5a | Fig. 5b | Fig. 5c |
|---|---|---|---|
| Formation stability | Good | Good | Good. |
| Coolability | Somewhat good | Somewhat bad | Do. |
| Operability | Good | Good | Do. |
| Formation range: | | | |
| Thickness, mm | 0.02–0.3 | 0.02–0.3 | 0.02–03. |
| Bending dia. variation | 0.8–1.4 | 0.8–1.4 | 0.8–1.4. |
| L, mm | 120 | 10–15 | 60; |
| $l$, mm | 10–15 | 10 | 10. |

As shown in the above result, the manufacturing method based on FIGS. 5a–5c is now understood to be superior to the conventional method, namely Dow method, but it has advantages and disadvantages over the other, respectively.

Consequently, it is apparent that the sizes of L and $l$ and the selection of the manufacturing apparatus have to be determined by the various conditions of the kind of material used, the quality and the thickness thereof, and the like.

In addition, as it is clear by the present embodiment, by one cooling and manufacturing method it is possible to perform the whole process in the range of blow ratio of 0.8–1.4 and it is not necessary to exchange the cooling ring at each time of the bending diameter change, and such exchanges greatly hamper the high quantity production capacity in handling as well as in time.

As to the embodiments according to the present invention as the above, the details thereof have been described together with the experiments in a plurality, but in any case, since the size of the cylindrical film can be selected to any size thereof so long as the width of the cylindrical film $f$ is a size less than the width of the screening boxes 5, 5, the size of the cylindrical film can be selected to any desired size, and therefore it is possible to manufacture the film $f$ of almost any size by a set of the screening boxes 5, 5.

EMBODIMENT 2

The present embodiment being the manufacturing method and its manufacturing equipment for so-called corrugated type cylindrical film $f$, in FIG. 7–FIG. 10c the structure thereof, especially the product formed thereby and the screening boxes 5, 5 are shown.

The screening boxes 5, 5 shown in FIG. 7–FIG. 8b are those for both side corrugated film $f$, and respective one side of the mutually opposing faces of cooling liquid screening portions 6, 6 of each screening boxes 5, 5 is provided with corrugated portions 20, 20 projected inwardly in a mound form each, and in addition, the angle $\theta$ of the mound being acute gradually as it goes down to the lower portion from its upper portion, and further they are communicated with the cooling liquid chambers 7, 7 boring through the cooling liquid screening portion 6', 6'.

In consequence, one of said corrugated portions 20, 20 being connectedly provided on the left hand side of a pair of the screening boxes 5, 5, and the other on the right hand side, respectively, whereby a molding space as shown in FIGS. 8a and 8b can be maintained, and thereby in the similar method as described in said embodiment 1, the cylindrical film $f$ protruded through the die absorbs the liquid from all over the surfaces by the flat cooling liquid screening portions 6, 6 of screening boxes 5, 5 and by the cooling liquid screening portions 6', 6' formed on the mound-form with corrugated portions 20 or 20', and therefore the film $f$ is being cooled and formedly worked, and then a beautiful both side corrugated cylindrical film $f$ is obtainable.

Next, FIG. 9a and FIG. 9b, out of a pair of the screening boxes 5, 5, show that one or more than two of the mound-form corrugated portions 20 or 20' are formed on only one screening box 5, and similarly the cooling liquid screening part 6' is bored, and in order to form one side corrugated films shown in FIG. 10b and FIG. 10c both the screening boxes 5, 5 a forming spacing is so formed as to be obtainable by the mutual contact on both the sides.

By having both the screening boxes shifted on a plane in opposite directions, since the shaping spacing can be varied in the area of the section, the size can be adjusted freely and the width of the cylindrical film $f$ never receives any restriction.

EMBODIMENT 3

In the present invention, at the same time when the cylindrical film is being manufactured, sealing work for forming bag bodies can be performed thereon, whereby the bag bodies can be produced continuously.

As shown in FIG. 11–FIG. 14, substantially at the same time when the fused resin film $f$ is contacted with the cooling liquid, a set of bars 22, 22 provided above the screening boxes 5, 5 being made to advance from the left and the right, the bars are so pressedly contacted as to interceptingly hold the cylindrical bag $f$ momentarily, the fused resin film is fusedly sealed very simply. When the cylindrical resin film $f$ is worked in a complete straight line at the time, air within the bag body 21, without escaping, remains within the bag body 21 and it gives bad influence in its post treatment, and its reeling disposition also becomes impossible, and therefore, for instance as shown in FIG. 13, on the film contact surface of one of the bar 22 three parallel projections 23, 24, and 25 being provided with mutual gaps $g$, then on the portions of each divided bag body 21 of the formed cylindrical film $f$ non-continuous gaps lines 27, 28 and 29 being formed by said projections 23, 24, and 25, and since the gaps $g$ are formed in the sealing line, the air within each bag body is easily discharged outside through the gaps, and said set of the bars 22, 22 being assembled at the front end each of arm rods 31, 31 having each pivot of 30, 30 and in the course of the protrusion of the cylindrical film $f$, said set of the bars 22, 22 being rotated with the pivots 30, 30 as the center, and said sealing work can be performed with desired spacings.

In the discharge of air at the time of sealing the bag as described above, however, one projected line being provided all along one of the bar 22, a pin for making a pin hole being provided on the underside of said projection being projectedly provided, it may be so arranged as to be enabled to discharge the air when the cylindrical film is sealed by the bar 22 (not shown). In addition, in this embodiment according to the present invention the functional effect of a pair of the screening boxes 5, 5 provided arranged mutually opposed is exactly the same as aforesaid two embodiments.

According to the present invention, as described above, since the fused resin is immediately being immersed into the cooling liquid and being guided by a pair of the screening boxes, is quickly cooled and solidified, the crystallization of the resin is prevented, whereby the film of very highly transparent is obtainable, and in addition, when the cylindrical film is cut into bags, the film on both the sides of cut opening, no inwardly curling takes place and therefore when goods are to be placed into the bag, the operation is extremely easy.

Furthermore, the product obtained thus is superior in anti-shocking quality in comparison with the product obtained by the conventional manufacturing method, and in addition as the distance from the die to the cooling liquid tank is sufficiently short and the cooling liquid in the liquid tank is constantly circulated, and also since the compensating supply of the cooling liquid is possible, the film can be cooled at a temperature maintained constant, consequently cooling effect is very good, and at the same time the depth of the cooling liquid tank can be changed freely and the compactness of the whole equipment can be obtained.

Also, so long as the liquid level of the cooling liquid can be maintained static, there is no ripple on the surface thereof and the smooth finish of the film is possible, and in addition, since the cooling liquid tank is provided with a pair of screening boxes each with perforations, slit holes or numerous suction holes bored within the cooling liquid, the fused resin film being always cooled by the fresh cooling liquid, which is being sucked in through said sucking holes, and by the negative pressure caused thereby the film is made to travel in the direction of reeling the film with the cooling liquid as its lubricator in contact with the cooling liquid screening portions of the screening boxes, and therefore there is no chance that either the shape of the tape is deteriorated or shrinkages are generated on its surface by the pressure of the cooling liquid.

Furthermore, by having the shape of the cooling liquid screening portions variously changed the bag-form of the pillow type of course, one side corrugated type or both side corrugated type can be manufactured at the same time of inflation work.

In addition, by having sealing means provided sealed bag bodies can be manufactured in continuation, and therefore the present invention is of multiple utilizations and indeed of a noble idea.

According to the present invention it is also possible to obtain two sheets each different in its physical character of film by spraying air or hot water onto its one side only directly before the film is dipped into the cooling liquid, and it is also possible to better the molding condition of folding portion by having the folding portion treated by cooling air locally beforehand by folding once expanded cylindrical film into a flat form by a pair of screening boxes.

In addition also, the bars 22, 22 in said embodiment 3 thereof being made freely rotatable, and being made so as to interpose the cylindrical film f therebetween and by the projections formed on the periphery of the roll-like bars 22 the sealing portion of the cylindrical film f being formed in a plurality in the advancing direction of the film in succession or by the projections in parallel formed on the rotary roll-like bars 22 the film being formed into square partitions in a plurality and thereby the bag-body are formed into bag-forms and in this case also the air in the bag-body pin holes being formed similarly and therethrough the air can be discharged (not shown).

As stated above, various embodiments according to the present invention have been described, but the present invention is not to be restricted within said embodiments, and any change or changes can be performed within the scope of the technical art of the present invention.

Now, what is claimed for patent by Letters Patent is as follows:

1. A manufacturing apparatus comprising a die of protruder type machine, a cooling liquid tank provided below said die, and a pair of mutually opposed screening boxes provided within the cooling liquid in said cooling liquid tank, and said screening boxes being positioned directly below of said die, which boxes have holes for screening the cooling liquid on their mutually opposed surfaces, a structure so as to conduct the cooling liquid onto a cooling liquid sucking chamber by a sucking mechanism and discharging the same outside being provided and so adapted as to have the fused cylindrical film protruded through the die suddenly cooled and molded.

2. The manufacturing apparatus of the thermoplastic synthetic resin film described in the foregoing claim 1, wherein numerous small holes are bored on the surfaces of a pair of the mutually opposed screening boxes provided within the cooling liquid of said cooling liquid tank.

3. The manufacturing apparatus described in the foregoing claim 1, wherein numerous slit holes being bored in a desired direction on the mutually opposed surfaces of a pair of the screening boxes provided within the cooling liquid in the cooling liquid tank whereby said slits are made of the cooling liquid screening portions.

4. The manufacturing equipment described in the foregoing claim 1, wherein small mesh net screens being provided on the mutually surfaces of a pair of the screening boxes provided within the cooling liquid in the cooling liquid tank, whereby said net screens are made the cooling liquid screening portions.

5. The manufacturing apparatus described in the foregoing claim 1, wherein the cooling liquid tank is so made as to be provided on the upper portion only of a pair of the mutually opposed screening boxes each having the cooling liquid screening portion.

6. The manufacturing equipment described in the foregoing claim 1, wherein the upper and lower tanks of the cooling liquid are divided for each of a pair of mutually opposed cooling liquid tanks installed for cooling the upper and lower portions each of the liquid screening boxes.

7. The manufacturing equipment described in the foregoing claim 1, wherein a pair of the mutually opposed cooling liquid screening boxes having the cooling liquid screening portions are so made as to be bently opened at the upper portions of said mutually opposed screening boxes.

8. The manufacturing apparatus described in the foregoing claim 1, wherein the upper spacing L of mutually opposedly arranged cooling liquid screening boxes and the lower spacing l being made freely variable within the cooling liquid, and in addition are made movable in opposite directions, respectively, in lateral direction.

9. The manufacturing apparatus described in claim 1, wherein on the mutually opposed surfaces of a pair of the screening box by having holes in a plurality and by recessed grooves in a plurality bored in a plurality in the places other than those of said holes in the cooling liquid screening boxes are formed.

References Cited
UNITED STATES PATENTS

| | | | |
|---|---|---|---|
| 3,169,272 | 2/1965 | Maxson | 18—14 |
| 3,275,723 | 9/1966 | Cappuccio | 18—14 X |
| 3,377,413 | 4/1968 | Jansson et al. | 18—14 X |
| 2,423,260 | 7/1947 | Slaughter | 18—14 X |

WILBUR L. McBAY, Primary Examiner

U.S. Cl. X.R.

264—95